UNITED STATES PATENT OFFICE.

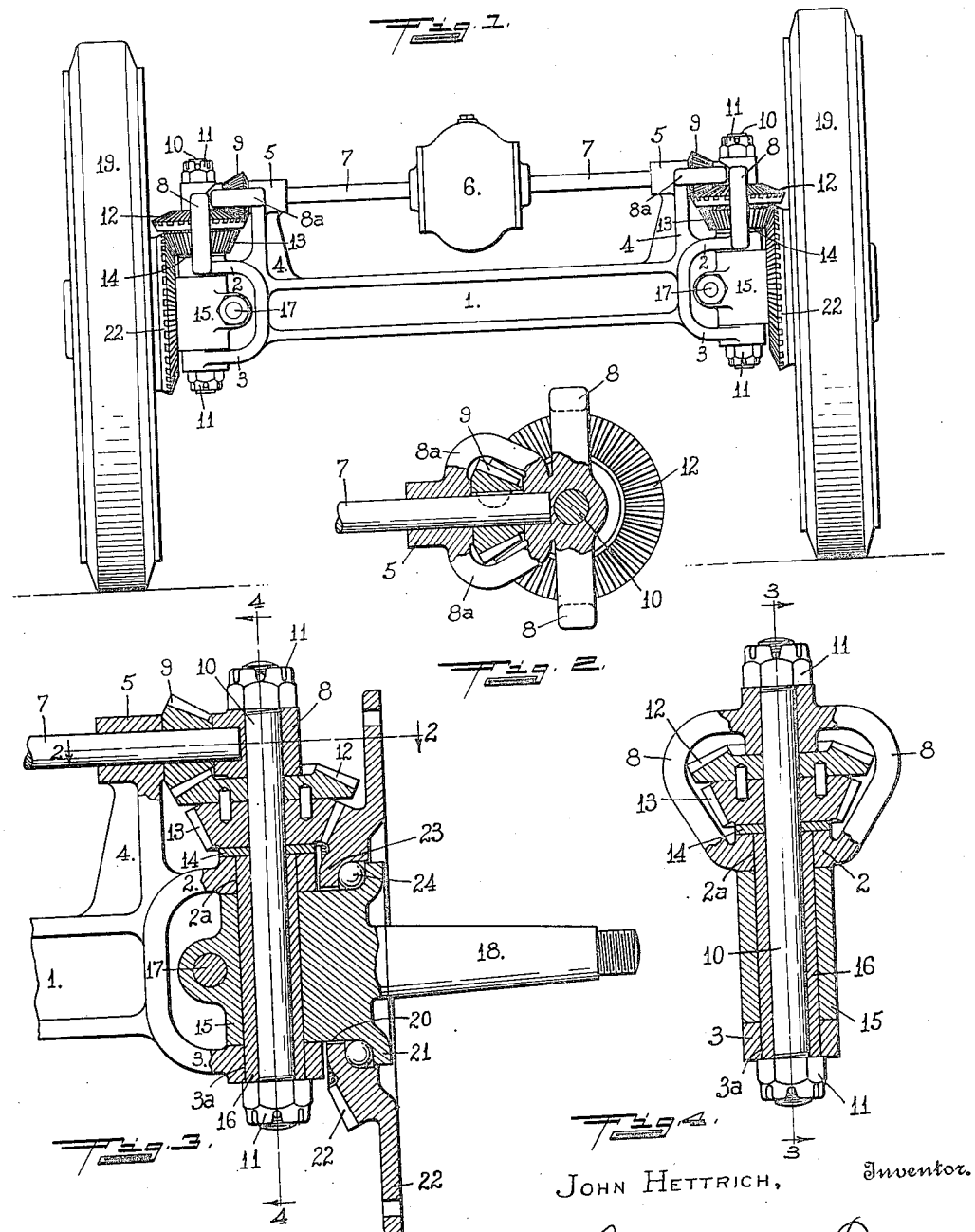

JOHN HETTRICH, OF LINCOLN, NEBRASKA.

AUTOMOBILE DRIVING-GEAR.

1,265,449.   Specification of Letters Patent.   Patented May 7, 1918.

Application filed November 30, 1917. Serial No. 204,562.

*To all whom it may concern:*

Be it known that I, JOHN HETTRICH, a citizen of the United States, residing in the city of Lincoln, county of Lancaster, and State of Nebraska, have invented certain new and useful Improvements in Automobile Driving-Gear, and have described the same in the following specification, illustrated by the accompanying drawings.

My invention relates to that class of automobile driving gears which are commonly used in connection with knuckle-jointed axles and which individually comprise a gear ring affixed to the inner face of a bearing wheel, and a differentially driven pinion meshing with the ring. Such a driving gear is described in Letters Patent No. 1,032,903, which were issued to me therefor July 16th, 1912. It is the main object of the present invention, to increase the compactness and stability of gearing of this kind; to produce a superior distribution of stresses therein; to hold the pinion constantly and invariably in its proper position relatively to the gear ring; to produce a retaining engagement between the gear ring and the pivoted knuckle member; and in general to produce a superior driving gear of the specified class. To accomplish this object I incorporate in my improved driving gear, as parts thereof, a pivoted knuckle member which has a retaining engagement with the gear ring.

In said drawings, illustrating the best manner in which I have contemplated applying the principles of my invention, Figure 1 is an end elevation of an automobile running gear which is provided with driving gear constructed and applied in accordance with these principles. Fig. 2 is a horizontal section on the section line 2—2 in Fig. 3. Fig. 3 is a vertical section on the section line 3—3 in Fig. 4. Fig. 4, being a vertical section on the section line 4—4 in Fig. 3, represents an enlarged portion of Fig. 1.

In these figures, the numeral 1 denotes one of the fixed axles of the vehicle. Being bifurcated at each end, this axle has the terminal arms 2 and 3, which are perforated in vertical alinement to furnish the bearings 2ª and 3ª. The axle also carries two spaced posts 4, which are formed integrally therewith and are provided with the horizontally alined journal bearings 5. Continuously with the arm 2, the loop 8 extends symmetrically upward and is united with the top of the adjacent post 4 by the similar horizontal loop 8ª. In the bearings 5 respectively, and in the opposite sides of the differential gear case 6, are journaled the alined shafts 7, each of which carries the beveled pinion 9, keyed thereto within the loop 8ª. The spindle 10 of the knuckle joint is journaled in the bearings 2ª and 3ª and in the vertical perforation in the top of the loop 8, and is fastened therein by the terminal nuts 11. On this spindle, and encircling the same, are placed the beveled gear 12 in mesh with the pinion 9, the beveled gear 13 rigidly affixed to the gear 12, the washer 14 between the gear 13 and arm 2, and the knuckle member 15 with its bushing 16 which extends through the arms 2 and 3 and spans the space between them.

This knuckle member so pivoted between the axle arms 2 and 3, is provided with the usual steering arm 17 and the usual stub axle 18 for the bearing wheel 19. It has a cylindrical portion 20 and an annular retaining flange 21 outstanding therefrom, which are co-axial with the adjacent stub axle. The beveled gear ring 22, which is coaxially fastened to the inner face of the bearing wheel and meshes with the gear 13, has a central flange 23 which overhangs and encircles the cylindrical portion 20 of the knuckle member 15, and forms therewith and with the flange 21 the annular raceway which is occupied by the antifriction bearing walls 24.

I claim as my invention—

1. Driving gear of the specified class, comprising a fixed axle having a pair of terminal arms; a knuckle member pivoted between the arms, and having a cylindrical portion with a peripheral flange; a stub axle projecting coaxially from the knuckle member; a bearing wheel on the stub axle; a gear ring affixed coaxially to the wheel and having an internal annular flange coacting with the peripheral flange; and means for rotating the gear ring.

2. Driving gear of the specified class, comprising a fixed axle having at each end a pair of spaced arms; a knuckle member pivoted between each pair of arms, and having a cylindrical portion with an outstanding annular flange; a stub axle extending coaxially from the knuckle member; a bearing wheel on the stub axle; a gear ring affixed coaxially to the bearing wheel and having an internal annular flange spaced from the wheel; a plurality of antifriction balls between the flanges; and gearing for rotating the gear ring.

3. In a driving gear of the specified class, an integrally formed axle comprising at each end of the axle a pair of spaced arms with vertically alined journal bearings in the arms of each pair; a pair of spaced posts with horizontally alined bearings in the posts; and an intermediate framework connecting each post with the adjacent arm and having a journal bearing formed in the framework.

Witness my signature at Omaha, Nebraska, November 26, 1917.

JOHN HETTRICH.